United States Patent Office 3,784,572
Patented Jan. 8, 1974

3,784,572
PRODUCTION OF DELTA-SULTONES BY ISOMERI-
ZATION OF ALKENESULFONIC ACIDS
Delmar D. Krehbiel and Claude D. Butler, Ponca City,
Okla., assignors to Continental Oil Company, Ponca
City, Okla.
No Drawing. Filed May 3, 1971, Ser. No. 139,909
Int. Cl. C07d 89/06, 89/12
U.S. Cl. 260—327 S                                    3 Claims

ABSTRACT OF THE DISCLOSURE

Delta-sultones are produced by heat promoted isomerization of alkenesulfonic acids.

BACKGROUND OF THE INVENTION

This invention relates to a method for production of delta-sultones.

Delta-sultones are valuable chemical compositions. Delta-sultones can be hydrolyzed to 4-hydroxyalkanesulfonic acids. Such 4-hydroxyalkanesulfonic acids are readily converted to analogous sodium or potassium 4-hydroxyalkanesulfonates which are valuable detergents. Such alkali metal 4-hydroxyalkanesulfonates are particularly valuable as detergents in that they are little affected by hardness in water.

Materials having good hard water detersive properties are currently much sought after because of growing environmental concern over effects of phosphates often conventionally used in detergent formulations to improve hard water performance of currently used detergents. Therefore, technical advances which improve the availability and lower the cost of alkali metal 4-hydroxyalkanesulfonates have substantial importance.

This invention has importance in that a novel and improved method for producing the delta-sultone precursors to desirable 4-hydroxyalkanesulfonate detergents is disclosed.

OBJECTS OF THE INVENTION

An object of this invention is to produce a delta-sultone by heating an alkenesulfonic acid to a temperature sufficient to isomerize the alkenesulfonic acid to a delta-sultone.

Another object of this invention is to provide an improvement in the process whereby a mixture comprising a delta-sultone and an alkenesulfonic acid is admixed with a selective solvent and cooled to precipitate the delta-sultone which is separated from the mother liquor; the improvement comprising heating the mother liquor to distill the selective solvent therefrom and to isomerize the alkenesulfonic acids therein into an isomerization mixture comprising a delta-sultone and alkenesulfonic acids.

These and other objects and advantages will appear from the following description of the embodiments of the invention, and the most novel features will be particularly pointed out hereinafter in connection with the appended claims.

SUMMARY OF THE INVENTION

In one aspect, this invention discloses a method for isomerizing an alkenesulfonic acid to a delta-sultone by the application of heat.

In another aspect, this invention discloses an improvement in the process whereby a mixture comprising a delta-sultone and an alkenesulfonic acid is admixed with a selective solvent and cooled to precipitate the delta-sultone which is separated from the mother liquor; the improvement comprising heating the mother liquor to distill the selective solvent therefrom and to isomerize the alkenesulfonic acids therein into an isomerization mixture comprising a delta-sultone and alkenesulfonic acids.

DESCRIPTION OF THE PREFERRED EMBODIMENTS

Alkenesulfonic acids which are often advantageously isomerized according to the process of this invention are represented by the following structures:

$$R_1R_2R_3C-CH_2-CH=CHSO_3H$$
I
$$R_1R_2R_3C-CH_2-CH=CH-CH_2SO_3H$$
II
$$R_1R_2R_3C-CH=CH-CH_2-CH_2SO_3H$$
III wherein $R_1$ is an alkyl radical, and wherein $R_2$ and $R_3$ are alkyl or hydrogen. The materials represented by structure I are alpha-alkenesulfonic acids, the materials represented by structure II are beta-alkenesulfonic acids, and the materials represented by structure II are gamma-alkenesulfonic acids. Often, a preponderance of beta-alkenesulfonic acids is present. Minor amounts of delta, epsilon, and other alkenesulfonic acids can also be present. Such alkenesulfonic acids have in the range of about 10 to 20 carbon atoms per molecule. Mixtures of the position isomers can be isomerized, and mixtures of alkenesulfonic acids of differing chain length can also be isomerized.

Examples of some suitable alkenesulfonic acids include the following:

1-decenesulfonic acid
1-eicosenesulfonic acid
2-decenesulfonic acid
2-eicosenesulfonic acid
1-hexadecenesulfonic acid
2-hexadecenesulfonic acid
5-methyl-delta-penta-decenesulfonic acid
5,5-dimethyl-gamma-octadecenesulfonic acid and the like.

Some delta-sultones which are often advantageously produced by isomerization of alkenesulfonic acids according to the process of this invention are represented as follows:

$$R_1R_2R_3C-\underset{\underset{O\phantom{xxxxxx}SO_2}{|\phantom{xxxxxxxx}|}}{CH}-CH_2CH_2CH_2$$

wherein $R_1$ is an alkyl radical, and wherein $R_2$ and $R_3$ are alkyl or hydrogen. Such delta-sultones often contain in the range of about 10 to 20 carbon atoms per molecule. Mixtures of such sultones can be present.

Examples of some delta-sultones include the following:

delta-decanesultone
delta-eicosanesultone
delta-hexadecanesultone
5-methyl-delta-pentadecanesultone and the like.

To promote isomerization of alkenesulfonic acids to delta-sultones by the application of heat, the temperature applied should be above about 40° C., but below the decomposition temperature of either the particular delta-sultone produced or the decomposition temperature of the alkenesulfonic acid which is isomerized. Often, temperatures in the range of about 60 to 100° C. are most suitable.

The heat should be applied to the alkenesulfonic acid being isomerized for a sufficient time to effect the degree of isomerization desired. Often, heating times in the range of about 1 hour to 10 hours are most suitable.

Pressure sufficient to maintain the alkenesulfonic acid and the delta-sultone substantially completely in the liquid phase is employed. Often, pressures in the range of about 0.5 to 10 atmospheres are most suitable, and atmospheric pressure is often convenient.

According to one presently particularly preferred embodiment, the mother liquor (produced in a process whereby a mixture comprising a delta-sultone and an alkenesulfonic acid is admixed with a selective solvent and cooled to precipitate the delta-sultone which is separated from the mother liquor) is heated to distill the selective solvent therefrom and to isomerize the alkenesulfonic acids therein into an isomerization mixture comprising a delta-sultone and alkenesulfonic acids.

According to a still more presently preferred embodiment, the isomerization mixture is recycled into the process in a continuous manner at a point prior to the addition of the selective solvent.

According to another presently preferred embodiment, the isomerization mixture, which is produced by distilling a selective solvent and isomerizing the alkenesulfonic acids therein, is admixed with a selective solvent, the thus formed solution is cooled to precipitate the delta-sultone therefrom, and the preciiptated delta-sultone is separated from the mother liquor.

Processes whereby a mixture comprising a delta-sultone and an alkenesulfonic acid is admixed with a selective solvent and cooled to precipitate the delta-sultone which is separated from the mother liquor are disclosed in detail in concurrently filed application No. 139,910, filed on May 3, 1971, entitled "Sultone Recovery," of which Carl D. Kennedy, Claude D. Butler, and Delmor D. Krehbiel and Gene E. Nicks are the applicants and by concurrently filed application No. 139,908, filed on May 5, 1971, entitled "Recovery of Sultones" of which Claude D. Butler and Delmar D. Krehbiel are the applicants.

Concisely, application 139,910 discloses a method for recovering a sultone from a mixture consisting essentially of a sultone and an alkenesulfonic acid comprising dissolving the mixture in a solution consisting essentially of a lower alcohol plus water or a ketone plus water, cooling the resulting second solution to precipitate the sultone, and separating the sultone from the liquid filtrate (mother liquor).

Concisely, application number 139,908 discloses a method for recovering a sultone from a mixture consisting essentially of a sultone and an alkenesulfonic acid comprising dissolving the mixture in a solution consisting essentially of a lower alkane, cooling the resulting solution to precipitate the sultone, and separating the sultone from the liquid filtrate.

Mixtures consisting essentially of a sultone and alkenesulfonic acids from which sultones are recovered (according to the processes of the copending applications which are improved according to the process of this invention) generally contain in the range of about 5 to 95 percent by weight of delta-sultone which has heretofore been described.

Mixtures consisting essentially of a sultone and alkenesufonic acids (which are separated according to the processes of the copending applications wherein the process of the instant invention constitutes an improvement thereon) also contain in the range of about 5 to 95 weight percent of alkenesulfonic acid which has heretofore been described.

The lower alcohol employed according to the process of application 139,910 contains about 1 to 4 carbon atoms. Examples of suitable alcohols include: methanol, ethanol, 1-propanol, 2-propanol, 2-butanol, 2-methyl-2-propanol, 2-methyl-1-propanol, and the like.

The ketone employed according to the process of application 139,910 can generally have about 3 to 5 carbon atoms per molecule. Examples of suitable ketones include acetone, methyl ethyl ketone, 3-pentanone, and the like.

Mixtures of suitable alcohols, mixtures of suitable ketones, and mixtures of suitable alcohols and ketones can be employed according to application 139,910.

The solutions of that application which consist essentially of a lower alcohol plus water can contain in the range of about 10 to 90 percent by weight of water. Such solutions can contain in the range of about 10 to 90 percent by weight of lower alcohol.

The solutions of that application which consist essentially of a ketone plus water can contain about 10 to 90 weight percent of ketone. Such solutions can contain in the range of 10 to 90 percent by weight of water.

In general, according to that application, sufficient solution (consisting essentially of a lower alcohol plus water or a ketone plus water) to completely dissolve the mixture consisting essentially of a sultone and an alkensulfonic acid at temperatures at least about 10° C. higher than the point of precipitation of sultones therefrom, but below the lower of the boiling point of the solution consisting essentially of a lower alcohol plus water or a ketone plus water or the degradation temperature of the sultone, are employed. In general, in the range of about 5 to 30 parts by weight of solution consisting essentially of a lower alcohol plus water per part by weight of a mixture consisting essentially of a sultone and an alkensulfonic acid are often employed. Also, often, in the range of about 5 to 30 parts by weight of a solution consisting essentially of a ketone plus water per part by weight of mixture consisting essentially of a sultone and an alkensulfonic acid are often employed. Temperatures in the range of about 20 to 9° C. are often preferably employed. Preferably, to promote a maximum of efficiency, often a minimum amount of solution (consisting essentially of a lower alcohol plus water or solution containing a ketone plus water) necessary to completely dissolve the sultone and alkensulfonic acid is employed at a temperature only a few degrees below the boiling point (of the solution consisting essentially of a lower alcohol plus water or a solution consisting essentially of a ketone plus water).

According to that application, upon dissolving the mixture consisting essentially of a sultone and alkensulfonic acid in the solution consisting essentially of a lower alcohol plus water or the solution consisting essentially of a ketone plus water, the resulting solution is cooled according to the process of that invention to precipitate the sultone. Such cooling is sufficient to precipitate the sultone, but not so great that other materials began precipitating. In general, the solution is often cooled to temperatures in the range of about −10 to 20° C.

Uon precipitation of the sultones, according to the process of that application, the sultones which are precipitated are separated from the liquid filtrate. Such separation can be accomplished by any means known to the art for separating a solid material from a liquid. Often, such separation is conveniently effected by filtration or by centrifugation, techniques which are well known to the art.

The solution consisting essentially of a lower alcohol plus water, or the solution consisting essentially of a ketone plus water, or components thereof can readily be separated from the filtrate, as by distillation or the like, and recycled if desired according to that application.

The method of application 139,910 is advantageously employed to separate delta-sultones from the mixture consisting essentially of a delta-sultone and alkenesulfonic acids which is prepared by isomerizing the gamma-sultones in a mixture prepared by reacting $SO_3$ and 1-alkenes to gamma-sultones by the application of heat. Such isomerization of gamma-sultones to delta-sultones within mixtures formed by the reaction of $SO_3$ and 1-alkenes is well known to those skilled in the art.

The liquid alkane employed according to the process of application 139,908 is preferably a liquid alkane having in the range of about 5 to 10 carbon atoms. Examples of some suitable alkanes include the following:

pentane
hexane
decane
2-methylhexane
2,2-dimethylhexane and the like.

Mixtures of suitable alkanes can also be employed.

According to application 139,908 sufficient alkane to completely dissolve the mixture consisting essentially of a sultone and an alkensulfonic acid at temperatures at least about 10° C. higher than the point of precipitation of sultones therefrom but below the lower of the boiling point of the alkane or the degradation temperature of the sultone are employed. In the range of 2 to 15 parts by weight of alkane per part of weight of mixture consisting essentially of a sultone and an alkensulfonic acid are often preferably employed. Temperatures in the range of 20 to 100° C. are often preferably employed. Preferably, to promote maximum efficiency, often the minimum amount of alkane necessary to completely dissolve the sultone and alkenesulfonic acid mixture is employed at a temperature only a few degrees below the boiling point of the alkane.

Upon dissolving the mixture consisting essentially of a sultone and an alkenesulfonic acid in the alkane, according to application 139,908, the resulting solution is cooled according to the process of that invention to precipitate the sultone. Such cooling is sufficient to precipitate the sultone, but not so great that other materials begin precipitating. The solution is often preferably cooled to temperatures in the range of about −7 to +15° C.

Upon precipitation of the sultones, according to the process of application 139,908, the sultones which are precipitated are separated from the liquid filtrate. Such separation can be accomplished by any means known to the art for separating a solid material from a liquid. Often, such separation is conveniently effected by filtration or by centrifugation, techniques which are well known to the art.

The alkane can readily be separated from the filtrate, as by distillation, and recycled, if desired.

The method of application 139,908 is also most advantageously employed to separate delta-sultones from the mixture consisting essentially of a delta-sultone and alkenesulfonic acids which is prepared by isomerizing the gamma-sultones in a mixture (prepared by reacting $SO_3$ and 1-alkenes) to delta-sultones by the application of heat. Such isomerization of gamma-sultones to delta-sultones within mixtures formed by the reaction of $SO_3$ and 1-alkenes is well known to those skilled in the art.

The following examples are given to further illustrate some aspects of this invention, but are not to be considered limiting.

EXAMPLES

Example 1

A 1-hexadecene sulfonation product was prepared in a continuous sulfonation unit by charging 1-hexadecene at a rate of 8.4 ml. per hour (6.1 g./hr.) and $SO_3$ at the rate of 1.5 to 2.7 grams per hour at a temperature 40–60° C. and continuously withdrawing the sulfonation product as made.

The 1-hexadecene sulfonation product thus prepared was heated to 80° C. for two days to isomerize the gamma-hexadecanesultone therein to delta-hexadecanesultone.

A total of 2,124 grams of the isomerized 1-hexadecene sulfonation product was dissolved in 21 liters of hexane. This solution was cooled to 4.5° C. and allowed to stand for about 16 hours. A precipitate of delta-hexadecanesultone was formed. The precipitated delta-hexadecanesultone was filtered from the mother liquor and dried. The dryed delta-hexadecanesultone weighed 1,291 grams and constituted 60 weight percent of the 2,124 grams of 1-hexadecane sulfonation product. The delta-hexadecanesultone was determined to be 95% pure by analyses.

The filtrate or mother liquor was heated to distill all the hexane contained therein.

The remaining material after distillation of the hexane weighed 833 grams, and was determined to consist of 42 weight percent hexadecenesulfonic acids and 58 weight percent delta-hexadecanesultone.

The 1-hexadecene sulfonation product subsequent to isomerization was determined to contain 60 weight percent of delta-hexadecanesultone. This hexadecenesultone was recovered by precipitation from the hexane solution. Therefore, the 58 percent delta-hexadecanesultone present in the mother liquor or filtrate subsequent to heating was formed by conversion of hexadecenesulfonic acids to delta-hexadecanesultone by isomerization.

Example 2

The procedure of Example 1 is repeated except that in one run 1-decene is employed instead of 1-hexadecene, and in a second run 1-eicosene is employed instead of 1-hexadecene.

Results substantially similar to those in Example 1 are obtained.

Example 3

A continuous process is operated wherein 6.1 grams per hour of 1-hexadecene and 1.5 per hour of $SO_3$ are charged continuously to a reactor maintained at 40° C. The effluent from the reactor is passed to an isomerization reaction vessel maintained at 60° C. Residence time in the isomerization vessel is 3 hours. The isomerized mixture from the isomerization reaction vessel is then continuously passed at a temperature of about 25° C. through a mixer wherein 5 parts by weight of a mixture containing 5 weight percent of water and 70 weight percent of ethanol are provided for each part of the 1-hexadecene sulfonation product by weight. The solution formed by such mixing is then passed through a vessel wherein it is cooled to about 4° C. with substantial precipitation of the delta-hexadecanesultone therefrom. The precipitated delta-hexadecanesultone is separated, dried, and recovered as a product. The filtrate (or mother liquor) is then heated to distill the ethanol and water, which is recycled to the mixer, and to isomerize the 1-hexadecenesulfonic acids in the mother liquor.

The isomerized remainder of the mother liquor is recycled into the system as a portion of the isomerization mixture passing to the mixing vessel.

By operating thus, the 1-hexadecene sulfonation product is substantially converted to delta-hexadecanesultone, which is recovered as a pure product.

Example 4

A continuous process is operated wherein 6.1 grams per hour of 1-hexadecene and 2.7 per hour of $SO_3$ are charged continuously to a reactor maintained at 60° C. The effluent from the reactor is passed to an isomerization reaction vessel maintained at 100° C. Residence time in the isomerization vessel is 3 hours. The isomerized mixture from the isomerization reaction vessel is then continuously passed at a temperature of about 25° C. through a mixer wherein 30 parts by weight of a mixture containing 5 weight percent of water and 95 weight percent of ethanol are provided for each part of the 1-hexadecene sulfonation product by weight. The solution formed by such mixing is then passed through a vessel wherein it is cooled to about 4° C. with substantially precipitation of the delta-hexadecanesultone therefrom. The precipitated delta-hexadecanesultone is separated, dried, and recovered as a product. The filtrate (or other liquor) is then heated to distill the ethanol and water, which is recycled to the mixer, and to isomerize the 1-hexadecenesulfonic acids in the mother liquor.

The isomerized remainder of the mother liquor is recycled into the system as a portion of the isomerization mixture passing to the mixing vessel.

By operating thus, the 1-hexadecene sulfonation product is substantially converted to delta-hexadecanesultone, which is recovered as a pure product.

We claim:

1. In the process whereby a mixture consisting essentially of a delta-sultone of the formula:

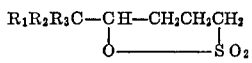

wherein $R_1$ is alkyl wherein $R_2$ and $R_3$ are alkyl or hydrogen, and wherein each molecule of delta-sultone has 10 to 20 carbon atoms and an alkenesulfonic acid of one of the formulas:

$R_1R_2R_3C-CH_2-CH=CHSO_3H$, $R_1R_2R_3C-CH_2-CH=CH-CH_2SO_3H$, or $R_1R_2R_3C-CH=CH-CH_2-CH_2SO_3H$ wherein $R_1$ is alkyl wherein $R_1$ and $R_3$ are alkyl or hydrogen, and wherein each molecule of alkenesulfonic acid has 10 to 20 carbon atoms is admixed with a selective solvent selected from the group consisting of a lower alcohol plus water, a ketone plus water, and a lower alkene to form a resulting solution; the resulting solution is cooled to a temperature sufficiently low to precipitate the delta-sultone, but sufficiently high that no other material is precipitated, which is separated from a thus formed mother liquor; the improvement comprising heating the mother liquor, subsequent to separation of the delta-sultone therefrom to distill the selective solvent therefrom and to isomerize the alkenesulfonic acid therein into an isomerization mixture comprising a delta-sultone and an alkenesulfonic acid; the heating being sufficient to isomerize the alkenesulfonic acid to delta-sultone and alkenesulfonic acid and to distill the selective solvent, but not being of sufficient intensity to cause degradation of alkenesulfonic acid, delta-sultone, or gamma sultone.

2. The process of claim 1 wherein the isomerization mixture is recycled into the process at a point prior to the addition of the selective solvent.

3. The process of claim 2 wherein the isomerization temperature is about 60 to 100° C.

References Cited

UNITED STATES PATENTS

| | | | |
|---|---|---|---|
| 3,409,637 | 11/1968 | Eccles et al. | 260—327 S |
| 3,428,654 | 2/1969 | Rubinfeld et al. | 260—327 S |
| 3,579,537 | 5/1971 | Rubinfeld et al. | 260—327 S |
| 3,164,609 | 1/1965 | Voss et al. | 260—327 S |
| 3,524,864 | 8/1970 | Rubinfeld et al. | 260—327 S |

OTHER REFERENCES

Fette et al.: "Anstrich Mittel," vol. 72, pp. 247–253 (1970).

HENRY R. JILES, Primary Examiner

R. T. BOND, Assistant Examiner

U.S. Cl. X.R.

260—513 R